United States Patent
Ji

(10) Patent No.: US 11,477,761 B2
(45) Date of Patent: Oct. 18, 2022

(54) SIDELINK TRANSMISSION METHOD AND TERMINAL

(71) Applicant: VIVO MOBILE COMMUNICATION CO., LTD., Chang'an Dongguan (CN)

(72) Inventor: Zichao Ji, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 4 days.

(21) Appl. No.: 17/069,035

(22) Filed: Oct. 13, 2020

(65) Prior Publication Data

US 2021/0029675 A1    Jan. 28, 2021

Related U.S. Application Data

(63) Continuation of application No. PCT/CN2019/080771, filed on Apr. 1, 2019.

(30) Foreign Application Priority Data

Apr. 13, 2018 (CN) .......................... 201810333591.2

(51) Int. Cl.
*H04W 72/02* (2009.01)
*H04W 72/12* (2009.01)
*H04W 24/10* (2009.01)
*H04W 92/18* (2009.01)
*H04L 1/18* (2006.01)
*H04B 7/06* (2006.01)
*H04L 5/00* (2006.01)

(52) U.S. Cl.
CPC .......... *H04W 72/02* (2013.01); *H04B 7/0626* (2013.01); *H04L 1/1819* (2013.01); *H04L 5/0055* (2013.01); *H04W 24/10* (2013.01); *H04W 72/1263* (2013.01); *H04W 92/18* (2013.01)

(58) Field of Classification Search
None
See application file for complete search history.

(56) References Cited

U.S. PATENT DOCUMENTS

2010/0177742 A1* 7/2010 Tang ................. H04L 25/03936
370/335
2016/0066337 A1 3/2016 Sartori
2016/0381666 A1 12/2016 Kim
(Continued)

FOREIGN PATENT DOCUMENTS

CN    106063352 A    10/2016
CN    106550316 A    3/2017
(Continued)

OTHER PUBLICATIONS

CN Office Action related to Application No. 201810333591.2 dated Apr. 24, 2020.
(Continued)

*Primary Examiner* — Scott M Sciacca
(74) *Attorney, Agent, or Firm* — von Briesen & Roper, s.c.

(57) ABSTRACT

Provided in an embodiment of the present disclosure are a sidelink transmission method and a terminal. The sidelink transmission method includes transmitting SCI through a PSCCH of a sidelink. The SCI includes an information field, and the information field is used to indicate physical layer information of the sidelink.

20 Claims, 2 Drawing Sheets

(56) References Cited

U.S. PATENT DOCUMENTS

| | | | |
|---|---|---|---|
| 2018/0014345 A1 | 1/2018 | Sartori | |
| 2018/0115362 A1 | 4/2018 | Yasukawa et al. | |
| 2018/0234220 A1 | 8/2018 | Yasukawa et al. | |
| 2020/0163155 A1* | 5/2020 | Lee | H04B 7/0632 |
| 2020/0178216 A1* | 6/2020 | Huang | H04W 72/0473 |
| 2020/0305176 A1* | 9/2020 | Hu | H04W 72/1263 |
| 2020/0328852 A1 | 10/2020 | Tang et al. | |

FOREIGN PATENT DOCUMENTS

| | | | |
|---|---|---|---|
| CN | 106793092 A | 5/2017 | |
| CN | 106797635 A | 5/2017 | |
| CN | 107534828 A | 1/2018 | |
| CN | 107733574 A | 2/2018 | |
| JP | 2021508205 A | 2/2021 | |
| WO | 2016158996 A1 | 10/2016 | |
| WO | 2016163972 A1 | 10/2016 | |
| WO | 2017026511 A1 | 2/2017 | |
| WO | 2019128418 A1 | 7/2019 | |
| WO | 2019/195505 A1 | 10/2019 | |

OTHER PUBLICATIONS

International Search Report and Written Opinion related to Application No. PCT/CN2019/080771 dated Oct. 22, 2020.

Intel Corporation, (Control Signaling Design Details for V2V Communication); R1-162366; Busan, Korea Apr. 11-15, 2016; pp. 1-7.

Huawei, HiSilicon, (Scheduling assignment design for V2V); R1-162642; Busan, Korea Apr. 11-15, 2016; pp. 1-5.

MCC TF160, Samsung, (NB-IoT: Introduction of Test Model); R5-169149; Reno, USA Nov. 14-18, 2016; pp. 1-45.

Panasonic, (Discussion on sidelink feedback in FeD2D); R1-1713856; Prague, Czechia Aug. 21-25, 2017; pp. 1-3.

Search Report for related European Application No. 19784306.3; report dated Apr. 29, 2021.

Huawei et al; "Feedback information for sidelink link adaptation", 3GPP Draft; R1-1712136, 3rd Generation Partnership Project (3GPP), Mobile Competence Centre; 650, Route Des Lucioles; F-06921 Sophia-Antipolis Cedex; France, vol. Ran WG1, no. Prague, Czech Republic; Aug. 21, 2017-Aug. 25, 2017, Aug. 20, 2017 (Aug. 20, 2017), XXP051314956, Retrieved from the internet: URL: http://www.3gpp.org/ftp/Meetings_3GPP_SYNC/RAN1/DOCs/ [retrieved on Aug. 20, 2017] *pp. 1-2*.

Intel Corporation: "On PSCCH and PSSCH retransmission and combining options", 3GPP Draft; R1-167695 Intel—V2V RETX, 3rd Generation Partnership Project (3GPP), Mobile Competence Centre ; 50, Route Des Lucioles ; F-06921 Sophia-Antipolis Cedex; France, vol. RAN WG1, no. Gothenburg. Sweden; Aug. 22, 2016-Aug. 26, 2016 Aug. 21, 2016 (Aug. 21, 2016), XP051126033, Retrieved from the Internet: URL:http://www.3gpp.org/ftp/Meetings_ 3GPP_ SYNC/RAN1/Docs/ [retrieved on Aug. 21, 2016] * p. 3 *.

ZTE: "Discussion on FeD2D Feedback scheme", 3GPP Draft; R1-1707210—6.2.9.2.3.4 Sidelink Feedback of FED2D Relay, 3rd Generation Partnership Project (3GPP), Mobile Competence Centre; 650, Route Des Lucioles ; F-06921 Sophia-Antipolis Cedex, vol. RAN WG1, no. Hangzhou; May 15, 2017-May 19, 2017 May 14, 2017 (May 14, 2017), XP051272425, Retrieved from the Internet: URL:http://www.3gpp.org/ftp/Meetings_3GPP_SYNC/RAN1/Docs/ [retrieved on May 14, 2017] * pp. 3-4 *.

Sequans Communications: "Latency Reduction in L2 relay Architecture", 3GPP Draft; R2-1705124—Latency Reduction in L2 Relay Architecture, 3RD Generation Partnership Project (3GPP), Mobile Competence Centre ; 650, Route Des Lucioles ; F-06921 Sophia-Antipolis Cedex ; FR, vol. RAN WG2, no. Hangzhou, China; May 15, 2017-May 19, 2017 May 14, 2017 (May 14, 2017), XP051275600, Retrieved from the Internet: URL:http://www.3gpp.org/ftp/Meetings_ 3GPP_SYNC/RAN2/Docs/ [retrieved on May 14, 2017] * pp. 1-2.

Notice of Reasons for Refusal related to Japanese Application No. 2020-555767; dated Nov. 30, 2021.

* cited by examiner

SIDELINK TRANSMISSION METHOD AND TERMINAL

CROSS-REFERENCE TO RELATED APPLICATION

The present application is a continuation of PCT Application No. PCT/CN2019/080771 filed on Apr. 1, 2019, which claims a priority of the Chinese patent application No. 201810333591.2 filed in China on Apr. 13, 2018, which is incorporated herein by reference in its entirety.

TECHNICAL FIELD

The present disclosure relates to the field of communications technology, in particular to a sidelink transmission method and a terminal.

BACKGROUND

Currently, a long terminal evolution (Long Term Evolution, LTE) system supports sidelink, which is used to perform direct transmission between terminals, rather than through a network device. However, in the current LTE system, the sidelink transmission is performed on the basis of broadcasting, and a receiving terminal does not feed back any information to a transmitting terminal. For example, when only one piece of data is transmitted, the receiving terminal may probably fail to receive the piece of data due to various reasons, so transmission reliability of the system is relatively low. When a plurality of pieces of same data is broadcast by the transmitting data to ensure the data transmission reliability, a resource utilization rate and the frequency efficiency of the system may be reduced. In a word, the current sidelink transmission performance is insufficient.

SUMMARY

An embodiment of the present disclosure is to provide a sidelink transmission method and a terminal.

In a first aspect, the present disclosure provides in an embodiment a sidelink transmission method operable by a first terminal, including transmitting sidelink control information (Sidelink Control Information, SCI) through a physical sidelink control channel (Physical Sidelink Control Channel, PSCCH) of a sidelink. The SCI includes an information field, and the information field is used to indicate physical layer information of the sidelink.

In a second aspect, the present disclosure provides in an embodiment a sidelink transmission method operable by a second terminal, including receiving SCI through a PSCCH of a sidelink. The SCI includes an information field, and the information field is used to indicate physical layer information of the sidelink.

In a third aspect, the present disclosure provides in an embodiment a terminal, which is a first terminal and includes a transmission module configured to transmit SCI through a PSCCH of a sidelink. The SCI includes an information field, and the information field is used to indicate physical layer information of the sidelink.

In a fourth aspect, the present disclosure provides in an embodiment a terminal, which is a second terminal and includes a reception module configured to receive SCI through a PSCCH of a sidelink. The SCI includes an information field, and the information field is used to indicate physical layer information of the sidelink.

In a fifth aspect, the present disclosure provides in an embodiment a terminal, which is a first terminal and includes a memory, a processor, and a computer program stored in the memory and capable of being executed by the processor. The processor is configured to execute the computer program so as to implement the steps of the sidelink transmission method for a side of the first terminal according to an embodiment of the present disclosure.

In a sixth aspect, the present disclosure provides in an embodiment a terminal, which is a second terminal and includes a memory, a processor, and a computer program stored in the memory and capable of being executed by the processor. The processor is configured to execute the computer program so as to implement the steps of the sidelink transmission method for a side of the second terminal according to an embodiment of the present disclosure.

In a seventh aspect, the present disclosure provides in an embodiment a computer-readable storage medium storing therein a computer program. The computer program is capable of being executed by a processor to implement the steps of the sidelink transmission method for the side of the first terminal or the steps of the sidelink transmission method for the side of the second terminal according to the embodiments of the present disclosure.

According to the embodiments of the present disclosure, the SCI may be transmitted through the PSCCH of the sidelink, the SCI may include the information field, and the information field may be used to indicate the physical layer information of the sidelink. As a result, it is able to improve the sidelink transmission performance.

DETAILED DESCRIPTION

Figure 1:
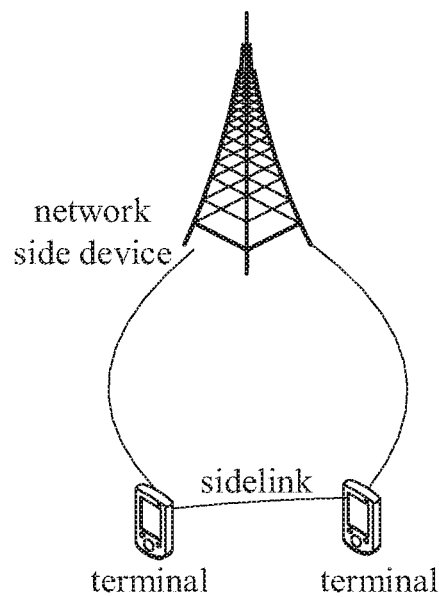
FIG. 1 is a structure schematic view showing an applicable network system according to an embodiment of the present disclosure.

FIG. 1 is a structure schematic view showing an applicable network system according to an embodiment of the present disclosure. As shown in FIG. 1, the network system includes a plurality of terminals. The terminal may also be called as terminal device or user equipment (User Equipment, UE), and it may be a terminal side device such as mobile phone, tablet personal computer, laptop computer, personal digital assistant (Personal Digital Assistant, PDA), mobile Internet device (Mobile Internet Device, MID), wearable device, or vehicle-mounted device. It should be appreciated that, in the embodiments of the present disclosure, a specific type of the terminal will not be particularly defined. In the embodiments of the present disclosure, the plurality of terminals may communicate with each other through a sidelink, e.g., transmit data or signaling. In addition, the plurality of terminals may communicate with each other through the sidelink in a one-to-one, one-to-many or many-to-one manner, which will not be limited thereto. Naturally, the network system may further include a network side device, and the network side device may communicate with the terminals, e.g., transmit signaling or data. Naturally, in some scenarios, it is impossible for some terminals to communicate with the network side device, e.g., when the terminals are located beyond a coverage of the network. The network side device may be a base station, e.g., a $4^{th}$-generation (4th-Generation, 4G) base station, a $5^{th}$-generation ($5^{th}$-Generation, 5G) base station, a future base station, or a base station in any other communications system. The base station may also be called as node B, evolved node B, or any other term known in the art. The base station shall not be limited to a specific technical term, as long as a same technical effect is achieved. It should be appreciated that, only the 5G base station is taken as an example in the embodiments of the present disclosure, but a specific type of the network side device will not be limited thereto.

Figure 2:
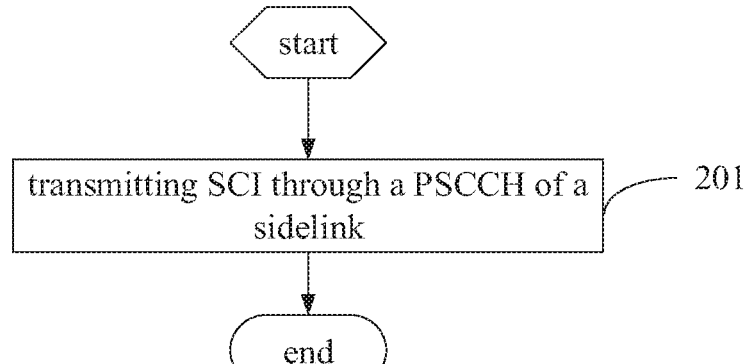
FIG. 2 is a flow chart of a sidelink transmission method according to an embodiment of the present disclosure.

As shown in FIG. 2, the present disclosure provides in an embodiment a sidelink transmission method operable by a first terminal, which includes Step 201 of transmitting SCI through a PSCCH of a sidelink. The SCI includes an information field, and the information field is used to indicate physical layer information of the sidelink.

The SCI may be SCI transmitted by an opposite terminal (a second terminal), e.g., SCI transmitted by the first terminal to the opposite terminal prior to or during the transmission of data via the sidelink. The physical layer information may be related information of a transmission state of a physical layer of the sidelink or channel quality. For example, the physical layer information may be feedback information of the physical layer, e.g., retransmission acknowledge or channel state information (Channel State Information, CSI), or the physical layer information may be, e.g., information of a measurement configuration of the physical layer or a reference signal configuration. Because the SCI includes the information field indicating the physical layer information of the sidelink, the first terminal and the opposite terminal may perform the corresponding transmission in accordance with the physical layer information during the data transmission.

It should be appreciated that, in the sidelink, the first terminal may serve as a receiving terminal or a transmitting terminal, which will not be particularly defined herein. This is because, in a sidelink transmission scenario, the signaling or data transmission may be performed in a two-way manner.

In Step 201, the SCI may indicate the physical layer information through the information field, so as compared with the related art where the receiving terminal does not feed back any information to the transmission end, in the embodiments of the present disclosure, it is able to improve the sidelink transmission performance.

In addition, through the SCI, it is able to configure channel measurement for the physical layer of the sidelink and transmit physical layer feedback information, so as to establish a physical layer point-to-point connection between the first terminal and the opposite terminal, and support the terminal to perform the transmission at the physical layer of the sidelink in a unicasting manner, and feed back the retransmission acknowledgement or the CSI or the like. In addition, it is able to match beams between the terminals, so as to improve a resource utilization rate of the system and the spectrum efficiency, thereby to improve the sidelink transmission performance. For example, the first terminal and the second terminal may match beams in accordance with the physical layer feedback information, and transmit the data using the matched beams. Alternatively, the second terminal may retransmit data in accordance with the physical layer feedback information fed back by the first terminal, and identically, the first terminal may perform such operations as data retransmission in accordance with the physical layer feedback information fed back by the second terminal.

It should be appreciated that, the method in the embodiments of the present disclosure may be applied to, but not limited to, an LTE sidelink or 5G new radio (New Radio, NR) sidelink. It may be applied to any other communications system, e.g., a 6-generation ($6^{th}$-Generation, 6G) system or any other communications system with the sidelink, as long as a substantially same function is capable of being achieved.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and a hybrid automatic repeat request (Hybrid Automatic Repeat Request, HARQ) process indicator.

The feedback information may be transmission feedback information, e.g., a transmission acknowledgement of a physical sidelink shared channel (Physical Sidelink Shared Channel, PSSCH) or a hybrid automatic repeat request acknowledgement (Hybrid Automatic Repeat Request Acknowledgement, HARQ-ACK), or the feedback information may be measurement feedback information, e.g., CST.

In a possible embodiment of the present disclosure, the feedback information may include at least one of retransmission acknowledgement information and a CSI measurement result.

Through the retransmission acknowledgement information, it is able to increase a success rate of the sidelink data transmission, because the transmitting terminal may retransmit the data in accordance with the feedback information after the data fed back has been received unsuccessfully. In addition, it is able to prevent the blind retransmission. Through the CSI measurement result, it is able to perform the transmission adaptively, e.g., perform beam matching, so as to improve the transmission performance.

Naturally, the feedback information may also be information capable of being fed back between the other terminals, which will not be particularly defined herein. Through the feedback information, it is able to increase the success rate of the data transmission, and perform the transmission adaptively in accordance with the feedback information, e.g., perform the beam matching. In a word, through the feedback information, it is able to improve the sidelink transmission performance.

The beta-offset indicator may be used to indicate beta-offset configuration actually used for feedback bits and resource mapping of the PSSCH when the feedback bits are transmitted by reusing the PSSCH. The beta-offset configuration may indicate the quantity of resource elements (Resource Elements, REs) allocated for the feedback bits. Through the beta-offset indicator, it is able to improve the interaction performance between the terminals, thereby to improve the sidelink transmission performance.

The scheduling data indicator may be used to indicate that only the feedback bits, rather than high-layer data or a transport block (Transport Block, TB), is carried in the PSSCH. Through the scheduling data indicator, it is able to improve the interaction performance between the terminals, thereby to improve the sidelink transmission performance.

The acknowledgement request indicator may be used to indicate whether to transmit acknowledgement feedback by the receiving terminal with respect to the PSSCH scheduled by the SCI. Through the acknowledgement request indicator, it is able to indicate whether to perform feedback by the receiving terminal, so as to prevent the receiving terminal from not performing any feedback or performing unnecessary feedback, thereby to improve the sidelink transmission performance. Naturally, in the embodiments of the present disclosure, whether to perform the feedback may also be pre-configured.

The measurement configuration may be used to indicate whether to enable sidelink measurement and indicate an enabled measurement configuration. Through the measurement configuration, it is able to improve the sidelink measurement performance.

The reference signal indicator may be used to indicate whether to enable sidelink reference signal measurement and indicate a reference signal configuration of a sidelink measurement reference signal. When the sidelink reference signal measurement is enabled, a resource mapping position of the PSSCH scheduled by the SCI may not overlap with a resource position of the reference signal. Through the reference signal indicator, it is able to improve the sidelink measurement performance.

The feedback object indicator may be used to indicate identification information of the receiving terminal, e.g., identity (ID), group ID, fixed ID, temporary ID or truncated ID. Through the feedback object, it is able to improve the sidelink feedback information.

The HARQ process indicator may be used to indicate at least one of an HARQ process of the SCI-scheduling data and an HARQ process of the HARQ-ACK feedback, so as to prevent the occurrence of an error, thereby to improve the sidelink transmission performance, e.g., prevent the processes for the two terminals from being different from each other.

It should be appreciated that, the above physical layer information may be encoded jointly, or some pieces of information may be indicated through different independent fields, which will not be limited thereto. In addition, the information in the physical layer information may be indicated through, e.g., pre-configuration, Radio Resource Control (RRC) signaling configuration by a network side, or through sidelink broadcasting configuration.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

The feedback indication field may include the feedback information, the beta-offset indication field may include the beta-offset indicator, the scheduling data indication field may include the scheduling data indicator, the acknowledgement request indication field may include the acknowledgement request indicator, the measurement configuration indication field may include the measurement configuration indicator, the reference signal indication field may include the reference signal indicator, the feedback object indication field may include the feedback object indicator, and the HARQ process number field may include the HARQ process indicator.

During the implementation, the SCI may include at least one of the above fields, so it is able to further improve the sidelink transmission performance.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include feedback bits representing the feedback information; or the feedback indication field may include a value in a predefined set, and the value may represent that the feedback information is carried in or reused by the PSSCH scheduled by the SCI.

The predefined value, the predefined code point and the predefined set may be predefined in a protocol, or pre-configured by the network side device, which will not be limited thereto. In addition, the quantity of cardinalities or elements in the predefined set may be greater than or equal to 1. In the embodiments of the present disclosure, the feedback indication field may be of a fixed length, e.g., M bits, where M is an integer greater than or equal to 1.

During the implementation, when the feedback indication field includes the predefined value or the predefined code point, it may be used to indicate that no feedback is to be performed. As a result, in some scenarios that no feedback needs to be performed, through the feedback indication field, it is able to prevent the transmitting terminal from waiting for a feedback behavior of the receiving terminal, thereby to improve the transmission efficiency between the transmitting terminal and the receiving terminal.

In addition, during the implementation, the feedback indication field may also directly include the feedback bits, i.e., the feedback may be performed through the SCI, so as to improve the feedback efficiency. The feedback bits in the feedback indication field may include feedback bits of all types, or feedback bits of some specific types (e.g., HARQ-ACK). The feedback bits of different types may be carried in accordance with communication requirements, so as to improve the sidelink feedback performance.

In addition, during the implementation, the feedback indication field may also be used to indicate the feedback information is carried in or reused by the PSSCH, so as to enable the PSSCH to carry or reuse the feedback information.

Further, an encoding and mapping mode of the feedback information in the PSSCH may correspond to the value, and/or the quantity of the feedback bits of the feedback information in the PSSCH may correspond to the value.

In other words, at least one of the encoding and mapping mode and the quantity of the feedback bits of the feedback information in the PSSCH may correspond to the value. Different values may indicate different encoding and mapping modes and different quantities of feedback bits. In this regard, it is able to determine the encoding and mapping mode of the feedback information and the quantity of the feedback bits of the feedback information in accordance with the value, so as to accurately decode the feedback information.

Further, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

Through the above two implementation modes, it is able to perform the feedback flexibly in an appropriate way, thereby to improve the sidelink feedback performance.

Further, the feedback information may include at least one of retransmission acknowledgement information and a CSI measurement result.

Through the retransmission acknowledgement information, it is able to increase a success rate of the sidelink data transmission, because the transmitting terminal may retransmit the data in accordance with the feedback information after the data fed back has been received unsuccessfully. In addition, it is able to prevent the blind retransmission. Through the CSI measurement result, it is able to perform the transmission adaptively, e.g., perform beam matching, so as to improve the transmission performance.

In a possible embodiment of the present disclosure, the beta-offset indication field may be implemented in the following modes.

First mode: in the case that the feedback information is carried in or reused by the PSSCH scheduled by the SCI, the beta-offset indication field may be used to indicate a beta-offset configuration used for bit mapping of the PSSCH.

In this mode, it is able to indicate the beta-offset configuration used for the bit mapping of the PSSCH through the beta-offset indication field, so as to determine the beta-offset configuration in accordance with the beta-offset indication field, and transmit or receive the corresponding PSSCH, thereby to improve the transmission performance.

Second mode: the beta-offset indication field may include a predefined value or a predefined code point, and the predefined value or the predefined code point may represent that the feedback information is not carried in the SCI or the PSSCH scheduled by the SCI.

In this mode, it is able to indicate the beta-offset indication field and the feedback indication field together, i.e., it is able for the two to achieve a same function. The description about the predefined value or the predefined code point may refer to that about the predefined value or the predefined code point in the feedback indication field mentioned hereinabove with a same beneficial effect, and thus will not be particularly defined herein.

Third mode: values of the beta-offset indication field may be divided into two sub-spaces. In the case that the value of the beta-offset indication field belongs to a first predefined sub-space, the beta-offset indication field may be used to indicate that the feedback indication field includes a feedback bit and indicate the beta-offset configuration used for the bit mapping of the PSSCH. In the case that the value of the beta-offset indication field belongs to a second predefined sub-space, the beta-offset indication field may be used to indicate a specific feedback mode.

Identically, in this implementation, it is able to indicate the beta-offset indication field and the feedback indication field together, and indicate different contents through values of different sub-spaces, so as to improve the performance of the beta-offset indication field, thereby to meet different communication requirements.

In addition, the specific feedback mode may include a mode that the feedback indication field includes the predefined value or the predefined code point, a mode that the feedback indication field includes feedback information of a specific type, or a mode that whether only the feedback bits, rather than the high-layer data or a TB, are carried in the PSSCH scheduled by the SCI.

Naturally, the above three feedback modes are only for illustrative purposes, and the present disclosure is not limited thereto. The specific feedback mode may be configured in accordance with different communication requirements, so as to improve the SCI compatibility.

The scheduling data indication field, the acknowledgement request indication field, the measurement configuration indication field, the reference signal indication field, the feedback object indication field and the HARQ process number field will be described hereinafter.

In a possible embodiment of the present disclosure, the scheduling data indication field may be used to indicate whether only the feedback bits, rather than the high-layer data or a TB, are carried in the PSSCH scheduled by the SCI. The scheduling data indication field may be a field independent of another field in the SCI, or the scheduling data indication field may be at least one value or code point in the other field. The other fields may be a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field.

Through the scheduling data indication field, it is able to indicate whether the PSSCH only carries the feedback bits, rather than the high-layer data or the TB, so as to improve the reciprocity between the terminals and prevent the occurrence of some errors. For example, when the PSSCH only carries the feedback bits, it is able to prevent the receiving terminal to receive the PSSCH in a data reception mode. In addition, when the scheduling data indication field is at least one value or code point in the other field, it is able to reduce signaling overhead.

In a possible embodiment of the present disclosure, the acknowledgement request indication field may be used to indicate whether to transmit acknowledgement feedback by the receiving terminal with respect to the PSSCH scheduled by the SCI, and the receiving terminal may be a terminal which receives the PSSCH.

It should be appreciated that, the receiving terminal may be the first terminal, or another terminal. This is because, during the transmission of PSSCH or signaling, the first terminal may serve as a transmitting terminal or a receiving terminal.

Through the acknowledge request indication field, it is able to prevent the receiving terminal from not performing any feedback or performing unnecessary feedback, so as to improve the sidelink transmission performance. Naturally, in the embodiments of the present disclosure, whether to perform the feedback may also be pre-configured.

In a possible embodiment of the present disclosure, the measurement configuration indication field may be used to indicate whether to enable sidelink channel measurement and indicate a measurement configuration for the sidelink channel measurement.

Through the measurement configuration indication field, it is able to configure the sidelink channel measurement, thereby to improve the sidelink measurement performance.

In a possible embodiment of the present disclosure, the reference signal indication field may be used to indicate whether to enable sidelink reference signal measurement, and indicate a reference signal configuration of the sidelink measurement reference signal. When the sidelink reference signal measurement is enabled, a resource mapping position of the PSSCH scheduled by the SCI may not overlap with a resource position of the reference signal.

When the resource mapping position of the PSSCH scheduled by the SCI does not overlap with the resource position of the reference signal, it may be understood as that the resource mapping of the PSSCH needs to avoid a time-frequency position of the reference signal, so as to improve the measurement performance of the reference signal.

Through the reference signal indication field, it is able to improve the sidelink measurement performance.

Further, the measurement configuration indication field and the reference signal indication field may be encoded jointly, to reduce the signaling overhead.

In a possible embodiment of the present disclosure, the feedback object indication field may be used to indicate an ID of a receiving terminal, a group ID of the receiving terminal, a fixed ID of the receiving terminal allocated by a network, a temporary ID or a truncated ID of the receiving terminal allocated by the network. The receiving terminal may be a terminal that performs the feedback.

Identically, the receiving terminal may be the first terminal or the other terminal. This is because, during the transmission of the PSSCH or signaling, the first terminal may serve as a transmitting terminal or a receiving terminal.

Through the feedback object indication field, it is able to improve the sidelink feedback performance.

In a possible embodiment of the present disclosure, the HARQ process number field may be used to indicate at least one of an HARQ process for the SCI-scheduling data and an HARQ process for HARQ-ACK feedback.

Through the HARQ process number field, it is able to improve the sidelink transmission performance, and prevent the occurrence of errors, thereby to improve the sidelink transmission performance, e.g., prevent the processes for two terminals from being different from each other.

In a possible embodiment of the present disclosure, at least one field comprised in the information field may be indicated through pre-configuration, or RRC signaling configuration by the network side, or sidelink broadcasting configuration. In other words, the fields in the SCI may be indicated through pre-configuration, or RRC signaling configuration by the network side, or sidelink broadcasting configuration by the UE, so as to improve the flexibility of the SCI, reduce the signaling overhead, and meet the requirements on various terminals or the communication requirements.

The fields in the SCI will be illustratively described below in conjunction with examples.

First Example

As an SCI instance, the SCI may include, but not limited to, the feedback indication field, the feedback object indication field and the HARQ process number.

The feedback indication field may have 4 bits for carrying the feedback bits, i.e., at most 4 feedback bits (e.g., 2-bit HARQ-ACK and 2-bit CSI) may be carried.

It should be appreciated that, the above values are for illustrative purposes, but shall not be used to limit the present disclosure.

The feedback object indication field may have 8 or 16 bits for indicating one receiving terminal or a group of receiving terminals for the feedback bits. It may include an ID of a receiving terminal, a group ID, a fixed or temporary ID allocated by the network (e.g., a radio network temporary identity (Radio Network Temporary Identity, RNTI), or a truncated ID.

The HARQ process number field may have 1 to 4 bits for indicating an HARQ process scheduled by the SCI, an HARQ process for the HARQ-ACK feedback, or a combination thereof.

Second Example

As an SCI instance, the SCI may be used to schedule the PSSCH transmission, and the actual feedback bits may be reused by the PSSCH for transmission.

The feedback indication field of the SCI may have 2 bits for indicating the quantity of the feedback bits being carried in or reused, as well as an encoding and mapping mode.

When the feedback indication field=0, it means that no feedback bit is carried in or reused by the PSSCH; when the feedback indication field=1, it means that the quantity of the feedback bits is 1 to 11, and block encoding is used; when the feedback indication field=2, it means that the quantity of the feedback bits is 12 to 19, and polar encoding is used; and when the feedback indication field=3, it means that the quantity of the feedback bits is greater than 20, and polar encoding is used.

The beta-offset indication field in the SCI may be used to indicate a beta-offset configuration used when the feedback bits are mapped to the PSSCH.

The beta-offset may be pre-configured, or configured by the network side through high-layer signaling, or configured by the UE through high-layer signaling. There may exist N sets of configurations, the beta-offset indication field may have $\log_2(N)$ bits, and each value or code point may indicate one set of beta-offset configurations therein.

Third Example

As an SCI instance, the SCI may be used to schedule the PSSCH transmission, and the actual feedback bits may be reused by the PSSCH for transmission or directly carried in the SCI feedback indication field.

The feedback indication field in the SCI may have 3 bits, and at most 2 feedback bits may be carried.

When a most-significant bit of the feedback indication field is 1, it means that the actual feedback bits are carried by two least-significant bits in the feedback indication field, and no feedback bit is carried in the PSSCH. When the most-significant bit of the feedback indication field is 0, it means that the feedback bits are reused by the PSSCH for transmission, and specific contents may be determined in accordance with contents of the two least-significant bits. When the two least-significant bits are 0, it means that no feedback bit is carried in or reused by the PSSCH. When the two least-significant bits are 1, it means that the quantity of the feedback bits is 1 to 11, and block encoding is used. When the two least-significant bits are 2, it means that the quantity of the feedback bits is 12 to 19, and polar encoding is used. When the two least-significant bits are 3, it means that the quantity of the feedback bits is greater than 20, and polar encoding is used.

The beta-offset indication field in the SCI may be used to indicate a beta-offset configuration used when the feedback bits are mapped to the PSSCH.

The beta-offset may be pre-configured, or configured by the network side through high-layer signaling, or configured by the UE through high-layer signaling. There may exist N sets of configurations, the beta-offset indication field may have $\log_2(N)$ bits, and each value or code point may indicate one set of beta-offset configurations therein.

Fourth Example

As an SCI instance, the SCI may be used to schedule the PSSCH transmission, the CSI feedback bits may be reused by the PSSCH for transmission, and the HARQ-ACK may be directly carried in the SCI feedback indication field.

The feedback indication field in the SCI may have 4 bits, and at most 2 feedback bits may be carried.

Two bits in the feedback indication field (e.g., two most-significant bits) may be actual feedback bits carried in the PSSCH.

The remaining two bits in the feedback indication field (e.g., two least-significant bits) may be used to indicate the quantity of CSI feedback bits carried in or reused by the PSSCH, as well as an encoding and mapping mode for transmission. When the two least-significant bits are 0, it means that no CSI feedback is carried in or reused by the PSSCH. When the two least-significant bits are 1, it means that the quantity of CST feedback bits is 1 to 11, and block encoding is used. When the two least-significant bits are 2, it means that the quantity of CSI feedback bits is 12 to 19, and polar encoding is used. When the two least-significant bits are 3, it means that the quantity of CSI feedback bits is greater than 20, and polar encoding is used.

The beta-offset indication field in the SCI may be used to indicate a beta-offset configuration used when the feedback bits are mapped to the PSSCH.

The beta-offset may be pre-configured, or configured by the network side through high-layer signaling, or configured by the UE through high-layer signaling. There may exist N sets of configurations, the beta-offset indication field may have $\log_2(N)$ bits, and each value or code point may indicate one set of beta-offset configurations therein.

Fifth Example

As an SCI instance, the SCI may be used to schedule the PSSCH transmission, the actual feedback bits may be reused by the PSSCH for transmission, or directly carried in the SCI feedback indication field.

The beta-offset indication field in the SCI may have 3 bits for indicating positions of the feedback bits (whether the feedback bits are reused by the PSSCH or carried in the SCI feedback indication field).

For example, when a most-significant bit in the beta-offset indication field is 1, it means that the feedback bits are reused by the PSSCH, and at this time, two least-significant bits may be used to indicate an actually-used beta-offset configuration.

In the case that the most-significant bit in the beta-offset indication field is 0, when the two least-significant bits are 0, it means that no feedback is carried or reused; when the two least-significant bits are 1, it means that the feedback bits are carried in the feedback indication field in the SCI; when the two least-significant bits are 2, it means that the HARQ-ACK feedback is carried in the feedback indication field in the SCI; and when the two least-significant bits are 3, it means that the CSI feedback is carried in the feedback indication field in the SCI.

The feedback indication field in the SCI may have 2 bits, and at most 2 feedback bits may be carried.

Sixth Example

As an SCI instance, the SCI may be used to schedule the PSSCH transmission, the actual feedback bits may be reused by the PSSCH for transmission, or directly carried in the SCI feedback indication field.

The scheduling data indication field in the SCI may have 1 bit. When the bit has one value (e.g., 1), it means that only the feedback bits, rather than the high-layer data, are carried in the PSSCH (i.e., no TB is mapped to the PSSCH), and when the bit has another value (e.g., 0), it means that the feedback bits are reused by the PSSCH and transmitted together with the high-layer data or the TB.

The scheduling data indication field in the SC may also be encoded jointly with the feedback indication field. At this time, it is unnecessary to provide an independent scheduling data indication field, and instead, one value or code point in the feedback indication field may be used to indicate that only the feedback bits are carried in the PSSCH. In this regard, it is able to reduce the bit overhead for the SCI.

Taking the second example as an example, the feedback indication field in the SCI may have 2 bits, and one value may be used to indicate that only the feedback bits are carried in the PSSCH. When the feedback indication field=0, it means that no feedback bit is carried in or reused by the PSSCH; when the feedback indication field=1, it means that only the feedback bits are carried in the PSSCH when the feedback indication field=2, it means that the quantity of the feedback bits is 1 to 11 and block encoding is used; and when the feedback indication field=3, it means that the quantity of the feedback bits is greater than 12 and polar encoding is used.

The scheduling data indication field in the SCI may also be encoded jointly with the beta-offset indication field. At this time, it is unnecessary to provide an independent scheduling data indication field, and instead, one value or code point in the beta-offset indication field may be used to indicate that only the feedback bits are carried in the PSSCH. In this regard, it is able to reduce the bit overhead for the SCI.

Taking the fifth example as an example, as one method, when a most-significant bit of the beta-offset indication field is 0, two least-significant bits may be used to indicate that one set of configurations in the actually-used beta-offset configurations is used to indicate that only the feedback bits are carried in the PSSCH. As another method, when the most-significant bit of the beta-offset indication field is 1, a vale or code point of the two least-significant bits (e.g., when the two least-significant bits=3) may be used to indicate that only the feedback bits are carried in the PSSCH.

The scheduling data indication field in the SCI may also be encoded jointly with a time-domain or frequency-domain resource allocation field of the PSSCH scheduled by the SCI. At this time, it is unnecessary provide an independent scheduling data indication field, and a set of some values or code points in the time-domain or frequency-domain resource allocation field of the PSSCH may be used to indicate that only the feedback bits, rather than the high-layer data or a TB, are carried in the PSSCH scheduled by the SCI.

Seventh Example

As an SCI instance, the acknowledgement request indication field may have 2 bits for indicating whether the feedback bits are to be transmitted by a receiving terminal UE and how to transmit the feedback bits. For example, when the request indication field=, it means that the receiving terminal UE is not required to transmit the feedback bits; when the request indication field=1, it means that the receiving terminal UE is required to transmit all the feedback bits; when the request indication field=2, it means that the receiving terminal UE is required to transmit the CSI feedback bits; and when the request indication field=3, it means that the receiving terminal UE is required to transmit the HARQ-ACK feedback bits.

In a possible embodiment of the present disclosure, the acknowledgement request indication field may also be compressed to have 1 bit so as to reduce the overhead. At this time, the acknowledgement request indication field may be used to indicate a subset of the above contents.

Eighth Example

As an SCI instance, the measurement configuration indication field may have 1 or 2 bits. When the bit has one value (e.g., 0), it means that the measurement configuration is not enabled and the measurement result is not fed back, and when the bit has another value, it means that the measurement configuration is enabled. Different values may represent different measurement configurations. The specific measurement configuration may be pre-configured, or configured by the network side through high-layer signaling, or configured by the UE through sidelink broadcasting.

Ninth Example

As an SCI instance, the reference signal indication field may have 1 to 2 bits. When the bit has one value (e.g., 0), it means that the measurement reference signal is not transmitted, and when the bit has another value, it means that the measurement reference signal is enabled to be transmitted. Different values may represent different reference signal configurations. The specific reference signal configuration may be pre-configured, or configured by the network side through high-layer signaling, or configured by the UE through sidelink broadcasting.

Once the measurement reference signal has been transmitted, it means that the reference signal is reused by the PSSCH for transmission, and a resource mapping of the PSSCH needs to avoid a time-frequency position of the reference signal.

Tenth Example

As an SCI example, the measurement configuration indication field may be encoded jointly with the reference signal indication field, and it may have 1 to 2 bits. When the bit has one value (e.g., 0), it means that the measurement reference signal is not transmitted and the measurement configuration is not enabled, and when the bit has another value, it means that the measurement reference signal is enabled to be transmitted. Different values may represent different combinations of the reference signal configurations and the measurement configurations. The specific configuration combination may be pre-configured, or configured by the network side through high-layer signaling, or configured by the UE through sidelink broadcasting.

According to the embodiments of the present disclosure, the SCI may be transmitted through the PSCCH of the sidelink, the SCI may include the information field, and the information field may be used to indicate the physical layer information of the sidelink. As a result, it is able improve the sidelink transmission performance.

Figure 3:
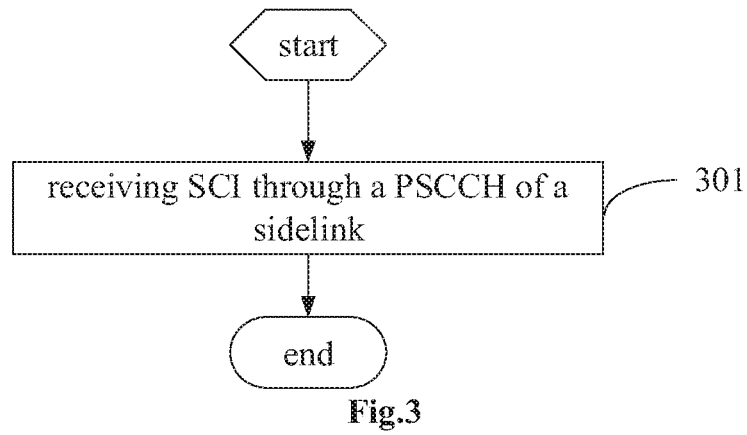
FIG. 3 is a flow chart of another sidelink transmission method according to an embodiment of the present disclosure.

As shown in FIG. 3, the present disclosure further provides in an embodiment another sidelink transmission method operable by a second terminal, which includes Step 301 of receiving SCI through a PSCCH of a sidelink. The SCI includes an information field, and the information field is used to indicate physical layer information of the sidelink.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and an HARQ process indicator.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include a feedback bit representing the feedback information; or the feedback indication field may include a value in a predefined set, and the value may represent that the feedback information is carried in or reused by the PSSCH scheduled by the SCI.

In a possible embodiment of the present disclosure, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

In a possible embodiment of the present disclosure, the feedback information may include at least one of retransmission acknowledgment information and a CSI measurement result.

In a possible embodiment of the present disclosure, an encoding and mapping mode of the feedback information in the PSSCH may correspond to the value, and/or the quantity of the feedback bits of the feedback information in the PSSCH may correspond to the value.

In a possible embodiment of the present disclosure, in the case that the feedback information is carried in or reused by the PSSCH scheduled by the SCI, the beta-offset indication field may be used to indicate a beta-offset configuration used for bit mapping of the PSSCH; or the beta-offset indication field may include a predefined value or a predefined code point, and the predefined value or the predefined code point may represent that the feedback information is not carried in the SCI or the PSSCH scheduled by the SCI; or in the case that a value comprised in the beta-offset indication field belongs to a first predefined sub-space, the beta-offset indication field may be used to indicate that the feedback indication field includes the feedback bits and indicate the beta-offset configuration used for the bit mapping of the PSSCH; or in the case that the value of the beta-offset indication field belongs to a second predefined sub-space, the beta-offset indication field may be used to indicate a specific feedback mode.

In a possible embodiment of the present disclosure, the specific feedback mode may include a mode that the feedback indication field includes the predefined value or the predefined code point, a mode that the feedback indication field includes feedback information of a specific type, or a mode that whether only the feedback bits, rather than high-layer data or a TB, are carried in the PSSCH scheduled by the SCI.

In a possible embodiment of the present disclosure, the scheduling data indication field may be used to indicate whether only the feedback bits, rather than the high-layer data or a TB, are carried in the PSSCH scheduled by the SCI, the scheduling data indication field may be a field independent of another field in the SCI, or the scheduling data indication field may be at least one value or code point in the other field, the other field may be a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field; or the acknowledgement request indication field may be used to indicate whether to transmit acknowledgement feedback by a receiving terminal with respect to the PSSCH scheduled by the SCI, and the receiving terminal may be a terminal which receives the PSSCH; or the measurement configuration indication field may be used to indicate whether to enable sidelink channel measurement and indicate a measurement configuration for the sidelink channel measurement; or the reference signal indication field may be used to indicate whether to enable sidelink reference signal measurement, and indicate a reference signal configuration of a sidelink measurement reference signal, wherein when the sidelink reference signal measurement is enabled, a resource mapping position of the PSSCH scheduled by the SCI may not overlap with a resource position of the reference signal; or the feedback object indication field may be used to indicate an ID of a receiving terminal, a group ID of the receiving terminal, a fixed ID of the receiving terminal allocated by a network, a temporary ID or a truncated ID of the receiving terminal allocated by the network, and the receiving terminal may be a terminal that performs feedback; or the HARQ process number field may be used to indicate at least one of an HARQ process for the SCI-scheduling data and an HARQ process for HARQ-ACK feedback.

In a possible embodiment of the present disclosure, the measurement configuration indication field and the reference signal indication field may be encoded jointly.

In a possible embodiment of the present disclosure, at least one field comprised in the information field is indicated through pre-configuration, or RRC signaling configuration by a network side, or sidelink broadcasting configuration.

It should be appreciated that, this embodiment may be an implementation of the second terminal corresponding to the embodiment as shown in FIG. 2, and the implementation of this embodiment may refer to that in the embodiment as shown in FIG. 2 with a same beneficial effect, which will not be particularly defined herein to avoid repeated recitation.

Figure 4:
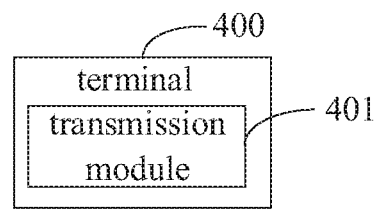
FIG. 4 is a structure schematic view showing a terminal according to an embodiment of the present disclosure.

As shown in FIG. 4, the present disclosure further provides in an embodiment a terminal 400 which is a first terminal. The terminal 400 includes a transmission module 401 configured to transmit SCI through a PSCCH of a sidelink. The SCI includes an information field, and the information field is used to indicate physical layer information of the sidelink.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and an HARQ process indicator.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include feedback bits representing the feedback information; or the feedback indication field may include a value in a predefined set, and the value may represent that the feedback information is carried in or reused by the PSSCH scheduled by the SC.

In a possible embodiment of the present disclosure, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

In a possible embodiment of the present disclosure, the feedback information may include at least one of retransmission acknowledgment information and a CSI measurement result.

In a possible embodiment of the present disclosure, an encoding and mapping mode of the feedback information in the PSSCH may correspond to the value, and/or the quantity of the feedback bits of the feedback information in the PSSCH may correspond to the value.

In a possible embodiment of the present disclosure, in the case that the feedback information is carried in or reused by the PSSCH scheduled by the SCI, the beta-offset indication field may be used to indicate a beta-offset configuration used for bit mapping of the PSSCH; or the beta-offset indication field may include a predefined value or a predefined code point, and the predefined value or the predefined code point may represent that the feedback information is not carried in the SCI or the PSSCH scheduled by the SCI; or in the case that a value comprised in the beta-offset indication field belongs to a first predefined sub-space, the beta-offset indication field may be used to indicate that the feedback indication field includes the feedback bits and indicate the beta-offset configuration used for the bit mapping of the PSSCH; or in the case that the value of the beta-offset indication field belongs to a second predefined sub-space, the beta-offset indication field may be used to indicate a specific feedback mode.

In a possible embodiment of the present disclosure, the specific feedback mode may include a mode that the feedback indication field includes the predefined value or the predefined code point, or a mode that the feedback indication field includes feedback information of a specific type, or a mode that whether only the feedback bits, rather than high-layer data or a TB, are carried in the PSSCH scheduled by the SCI.

In a possible embodiment of the present disclosure, the scheduling data indication field may be used to indicate whether only the feedback bits, rather than the high-layer data or a TB, are carried in the PSSCH scheduled by the SCI, the scheduling data indication field may be a field independent of another field in the SCI, or the scheduling data indication field may be at least one value or code point in the other field, the other field may be a PSSCH time-domain or frequency-domain resource allocation field, the feedback indication field, the beta-offset indication field, the acknowledge request indication field, the measurement configuration indication field, the reference signal indication field, the feedback object indication field, or the HARQ process number field; or the acknowledgement request indication field may be used to indicate whether to transmit acknowledgement feedback by a receiving terminal with respect to the PSSCH scheduled by the SCI, and the receiving terminal may be a terminal which receives the PSSCH; or the measurement configuration indication field may be used to indicate whether to enable sidelink channel measurement and indicate a measurement configuration for the sidelink channel measurement; or the reference signal indication field may be used to indicate whether to enable sidelink reference signal measurement, and indicate a reference signal configuration of a sidelink measurement reference signal, wherein when the sidelink reference signal measurement is enabled, a resource mapping position of the PSSCH scheduled by the SCI may not overlap with a resource position of the reference signal; or the feedback object indication field may be used to indicate an ID of a receiving terminal, a group ID of the receiving terminal, a fixed ID of the receiving terminal allocated by a network, a temporary ID or a truncated ID of the receiving terminal allocated by the network, and the receiving terminal may be a terminal that performs feedback; or the HARQ process number field may be used to indicate at least one of an HARQ process for the SCI-scheduling data and an HARQ process for HARQ-ACK feedback.

In a possible embodiment of the present disclosure, the measurement configuration indication field and the reference signal indication field may be encoded jointly.

In a possible embodiment of the present disclosure, at least one field comprised in the information field is indicated through pre-configuration, or RRC signaling configuration by a network side, or sidelink broadcasting configuration.

The terminal in the embodiments of the present disclosure is capable of implementing the procedures for the first terminal in the method embodiments as shown in FIG. 2, which will not be particularly defined herein to avoid repeated recitation. It is able to improve the sidelink transmission performance.

Figure 5:
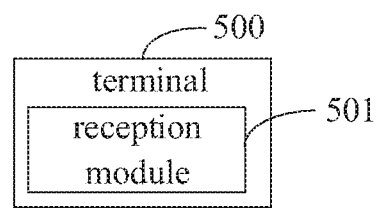
FIG. 5 is a structure schematic view showing another terminal according to an embodiment of the present disclosure.

As shown in FIG. 5, the present disclosure further provides in an embodiment a terminal 500 which is a second terminal. The terminal 500 includes a reception module 501 configured to receive SCI through a PSCCH of a sidelink. The SCI includes an information field, and the information field is used to indicate physical layer information of the sidelink.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and an HARQ process indicator.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include feedback bits representing the feedback information; or the feedback indication field may include a value in a predefined set, and the value may represent that the feedback information is carried in or reused by the PSSCH scheduled by the SCI.

In a possible embodiment of the present disclosure, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

In a possible embodiment of the present disclosure, the feedback information may include at least one of retransmission acknowledgment information and a CSI measurement result.

In a possible embodiment of the present disclosure, an encoding and mapping mode of the feedback information in the PSSCH may correspond to the value, and/or the quantity of the feedback bits of the feedback information in the PSSCH may correspond to the value.

In a possible embodiment of the present disclosure, in the case that the feedback information is carried in or reused by the PSSCH scheduled by the SCI, the beta-offset indication field may be used to indicate a beta-offset configuration used for bit mapping of the PSSCH; or the beta-offset indication field may include a predefined value or a predefined code point, and the predefined value or the predefined code point may represent that the feedback information is not carried in the SCI or the PSSCH scheduled by the SCI; or in the case that a value comprised in the beta-offset indication field belongs to a first predefined sub-space, the beta-offset indication field may be used to indicate that the feedback indication field includes the feedback bits and indicate the beta-offset configuration used for the bit mapping of the PSSCH; or in the case that the value of the beta-offset indication field belongs to a second predefined sub-space, the beta-offset indication field may be used to indicate a specific feedback mode.

In a possible embodiment of the present disclosure, the specific feedback mode may include a mode that the feedback indication field includes the predefined value or the predefined code point, a mode that the feedback indication field includes feedback information of a specific type, or a mode that whether only the feedback bits, rather than high-layer data or a TB, are carried in the PSSCH scheduled by the SCI.

In a possible embodiment of the present disclosure, the scheduling data indication field may be used to indicate whether only the feedback bits, rather than the high-layer data or a TB, are carried in the PSSCH scheduled by the SCI, the scheduling data indication field may be a field independent of another field in the SCI, or the scheduling data indication field may be at least one value or code point in the other field, the other field may be a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field, or the acknowledgement request indication field may be used to indicate whether to transmit acknowledgement feedback by a receiving terminal with respect to the PSSCH scheduled by the SCI, and the receiving terminal may be a terminal which receives the PSSCH; or the measurement configuration indication field may be used to indicate whether to enable sidelink channel measurement and indicate a measurement configuration for the sidelink channel measurement; or the reference signal indication field may be used to indicate whether to enable sidelink reference signal measurement, and indicate a reference signal configuration of a sidelink measurement reference signal, wherein when the sidelink reference signal measurement is enabled, a resource mapping position of the PSSCH scheduled by the SCI may not overlap with a resource position of the reference signal; or the feedback object indication field may be used to indicate an ID of a receiving terminal, a group ID of the receiving terminal, a fixed ID of the receiving terminal allocated by a network, a temporary ID or a truncated ID of the receiving terminal allocated by the network, and the receiving terminal may be a terminal that performs feedback; or the HARQ process number field may be used to indicate at least one of an HARQ process for the SC-scheduling data and an HARQ process for HARQ-ACK feedback.

In a possible embodiment of the present disclosure, the measurement configuration indication field and the reference signal indication field may be encoded jointly.

In a possible embodiment of the present disclosure, at least one field comprised in the information field is indicated through pre-configuration, or RRC signaling configuration by a network side, or sidelink broadcasting configuration.

The terminal in the embodiments of the present disclosure is capable of implementing the procedures for the second terminal in the method embodiments as shown in FIG. 3, which will not be particularly defined herein to avoid repeated recitation. It is able to improve the sidelink transmission performance.

Figure 6:
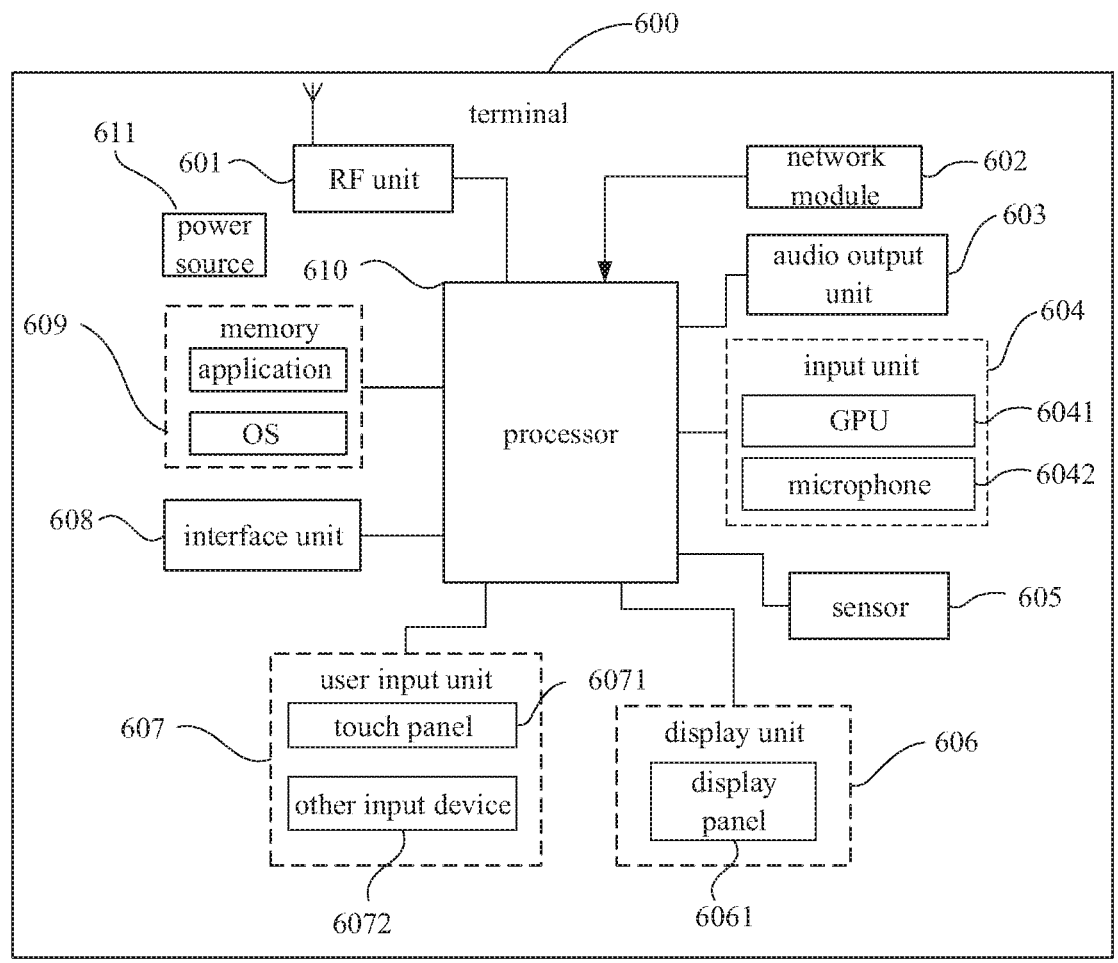
FIG. 6 is a structure schematic view showing yet another terminal according to an embodiment of the present disclosure.

FIG. 6 is a structure schematic view showing a hardware structure of a terminal according to an embodiment of the present disclosure. The terminal 600 includes, but not limited to, a Radio Frequency (RF) unit 601, a network module 602, an audio output unit 603, an input unit 604, a sensor 605, a display unit 606, a user input unit 607, an interface unit 608, a memory 609, a processor 610, and a power source 611. It should be appreciated that, the terminal may not be limited to the structure in FIG. 6, i.e., it may include more or fewer members, or some members may be combined, or the members may be arranged in different modes. In the embodiments of the present disclosure, the terminal may include, but not limited to, mobile phone, flat-panel computer, notebook computer, palmtop computer, vehicle-mounted terminal, wearable device and pedometer.

In a possible embodiment of the present disclosure, in the case that the terminal is the first terminal defined in the embodiments of the present disclosure, the radio frequency unit 60 is configured to transmit SCI through a PSCCH of a sidelink. The SCI includes an information field, and the information field is used to indicate physical layer information of the sidelink.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and an HARQ process indicator.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include feedback bits representing the feedback information; or the feedback indication field may include a value in a predefined set, and the value may represent that the feedback information is carried in or reused by the PSSCH scheduled by the SCI.

In a possible embodiment of the present disclosure, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

In a possible embodiment of the present disclosure, the feedback information may include at least one of retransmission acknowledgment information and a CSI measurement result.

In a possible embodiment of the present disclosure, an encoding and mapping mode of the feedback information in the PSSCH may correspond to the value, and/or the quantity of the feedback bits of the feedback information in the PSSCH may correspond to the value.

In a possible embodiment of the present disclosure, in the case that the feedback information is carried in or reused by the PSSCH scheduled by the SCI, the beta-offset indication field may be used to indicate a beta-offset configuration used for bit mapping of the PSSCH; or the beta-offset indication field may include a predefined value or a predefined code point, and the predefined value or the predefined code point may represent that the feedback information is not carried in the SCI or the PSSCH scheduled by the SCI; or in the case that a value comprised in the beta-offset indication field belongs to a first predefined sub-space, the beta-offset indication field may be used to indicate that the feedback indication field includes the feedback bits and indicate the beta-offset configuration used for the bit mapping of the PSSCH; or in the case that the value of the beta-offset indication field belongs to a second predefined sub-space, the beta-offset indication field may be used to indicate a specific feedback mode.

In a possible embodiment of the present disclosure, the specific feedback mode may include a mode that the feedback indication field includes the predefined value or the predefined code point, or a mode that the feedback indication field includes feedback information of a specific type, or a mode that whether only the feedback bits, rather than high-layer data or a TB, are carried in the PSSCH scheduled by the SCI.

In a possible embodiment of the present disclosure, the scheduling data indication field may be used to indicate whether only the feedback bits, rather than the high-layer data or a TB, are carried in the PSSCH scheduled by the SCI, the scheduling data indication field may be a field independent of another field in the SCI, or the scheduling data indication field may be at least one value or code point in the other field, the other field may be a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field, or the acknowledgement request indication field may be used to indicate whether to transmit acknowledgement feedback by a receiving terminal with respect to the PSSCH scheduled by the SCI, and the receiving terminal may be a terminal which receives the PSSCH; or the measurement configuration indication field may be used to indicate whether to enable sidelink channel measurement and indicate a measurement configuration for the sidelink channel measurement; or the reference signal indication field may be used to indicate whether to enable sidelink reference signal measurement, and indicate a reference signal configuration of a sidelink measurement reference signal, wherein when the sidelink reference signal measurement is enabled, a resource mapping position of the PSSCH scheduled by the SCI may not overlap with a resource position of the reference signal; or the feedback object indication field may be used to indicate an ID of a receiving terminal, a group ID of the receiving terminal, a fixed ID of the receiving terminal allocated by a network, a temporary ID or a truncated ID of the receiving terminal allocated by the network, and the receiving terminal may be a terminal that performs feedback; or the HARQ process number field may be used to indicate at least one of an HARQ process for the SCI-scheduling data and an HARQ process for HARQ-ACK feedback.

In a possible embodiment of the present disclosure, the measurement configuration indication field and the reference signal indication field may be encoded jointly.

In a possible embodiment of the present disclosure, at least one field comprised in the information field is indicated through pre-configuration, or RRC signaling configuration by a network side, or sidelink broadcasting configuration.

In another possible embodiment of the present disclosure, in the case that the terminal is the second terminal defined in the embodiments of the present disclosure, the radio frequency unit 601 is configured to receive SCI through a PSCCH of a sidelink. The SCI includes an information field, and the information field is used to indicate physical layer information of the sidelink.

In a possible embodiment of the present disclosure, the physical layer information may include at least one of feedback information, a beta-offset indicator, a scheduling data indicator, an acknowledgement request indicator, a measurement configuration, a reference signal indicator, a feedback object indicator and an HARQ process indicator.

In a possible embodiment of the present disclosure, the information field may include at least one of a feedback indication field, a beta-offset indication field, a scheduling data indication field, an acknowledgement request indication field, a measurement configuration indication field, a reference signal indication field, a feedback object indication field and an HARQ process number field.

In a possible embodiment of the present disclosure, the feedback indication field may include a predefined value or a predefined code point, and the predefined value or the predefined code point may represent that the feedback information is not carried in the SCI or the PSSCH scheduled by the SCI; or the feedback indication field may include feedback bits representing the feedback information; or the feedback indication field may include a value in a predefined set, and the value may represent that the feedback information is carried in or reused by the PSSCH scheduled by the SCI.

In a possible embodiment of the present disclosure, in the case that the quantity of the feedback bits of the feedback information is smaller than a specific threshold, the feedback indication field may include the feedback bits, and in the case that the quantity of the feedback bits of the feedback information is greater than or equal to the specific threshold, the feedback indication field may include the value in the predefined set.

In a possible embodiment of the present disclosure, the feedback information may include at least one of retransmission acknowledgment information and a CSI measurement result.

In a possible embodiment of the present disclosure, an encoding and mapping mode of the feedback information in the PSSCH may correspond to the value, and/or the quantity of the feedback bits of the feedback information in the PSSCH may correspond to the value.

In a possible embodiment of the present disclosure, in the case that the feedback information is carried in or reused by the PSSCH scheduled by the SCI, the beta-offset indication field may be used to indicate a beta-offset configuration used for bit mapping of the PSSCH; or the beta-offset indication field may include a predefined value or a predefined code point, and the predefined value or the predefined code point may represent that the feedback information is not carried in the SCI or the PSSCH scheduled by the SCI; or in the case that a value comprised in the beta-offset indication field belongs to a first predefined sub-space, the beta-offset indication field may be used to indicate that the feedback indication field includes the feedback bits and indicate the beta-offset configuration used for the bit mapping of the PSSCH; or in the case that the value of the beta-offset indication field belongs to a second predefined sub-space, the beta-offset indication field may be used to indicate a specific feedback mode.

In a possible embodiment of the present disclosure, the specific feedback mode may include a mode that the feedback indication field includes the predefined value or the predefined code point, or a mode that the feedback indication field includes feedback information of a specific type, or a mode that whether only the feedback bits, rather than high-layer data or a TB, are carried in the PSSCH scheduled by the SCI.

In a possible embodiment of the present disclosure, the scheduling data indication field may be used to indicate whether only the feedback bits, rather than the high-layer data or a TB, are carried in the PSSCH scheduled by the SCI, the scheduling data indication field may be a field independent of another field in the SCI, or the scheduling data indication field may be at least one value or code point in the other field, the other field may be a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field, or the acknowledgement request indication field may be used to indicate whether to transmit acknowledgement feedback by a receiving terminal with respect to the PSSCH scheduled by the SCI, and the receiving terminal may be a terminal which receives the PSSCH; or the measurement configuration indication field may be used to indicate whether to enable sidelink channel measurement and indicate a measurement configuration for the sidelink channel measurement; or the reference signal indication field may be used to indicate whether to enable sidelink reference signal measurement, and indicate a reference signal configuration of a sidelink measurement reference signal, wherein when the sidelink reference signal measurement is enabled, a resource mapping position of the PSSCH scheduled by the SCI may not overlap with a resource position of the reference signal; or the feedback object indication field may be used to indicate an ID of a receiving terminal, a group ID of the receiving terminal, a fixed ID of the receiving terminal allocated by a network, a temporary ID or a truncated ID of the receiving terminal allocated by the network, and the receiving terminal may be a terminal that performs feedback; or the HARQ process number field may be used to indicate at least one of an HARQ process for the SCI-scheduling data and an HARQ process for HARQ-ACK feedback.

In a possible embodiment of the present disclosure, the measurement configuration indication field and the reference signal indication field may be encoded jointly.

In a possible embodiment of the present disclosure, at least one field comprised in the information field is indicated through pre-configuration, or RRC signaling configuration by a network side, or sidelink broadcasting configuration.

According to the terminals in the above embodiments of the present disclosure, it is able to improve the sidelink transmission performance.

It should be appreciated that, in the embodiments of the present disclosure, the radio frequency unit 601 may transmit and receive signals during the information transmission or phone call. To be specific, the radio frequency unit 601 may, upon the receipt of downlink data from a base station, transmit the downlink data to the processor 610 for subsequent treatment. In addition, the radio frequency unit 601 may transmit uplink data to the base station. Usually, the radio frequency unit 601 may include, but not limited to, an antenna, at least one amplifier, a transceiver, a coupler, a low-noise amplifier and a duplexer. In addition, the radio frequency unit 601 may communicate with a network and another device via a wireless communications system.

The network module 602 is configured to enable the terminal to access the broadband Internet in a wireless manner, e.g., help a user to receive and send an e-mail, browse a web page or access a streaming media.

The audio output unit 603 is configured to convert audio data received by the radio frequency unit 601 or the network module 602, or audio data stored in the memory 609, into an audio signal and output the audio signal as a sound. In addition, the audio output unit 603 is further configured to provide an audio output related to a specific function executed by the terminal 600 (e.g., a sound occurring when a calling signal or a message has been received). The audio output unit 603 may include a loudspeaker, a buzzer and a receiver.

The input unit 604 is configured to receive an audio or video signal. The input unit 604 may include a graphics processing unit (Graphics Processing Unit, GPU) 6041 and a microphone 6042. The GPU 6041 is configured to process image data of a static image or video acquired by an image collection unit (e.g., a camera) in a video capturing mode or an image capturing mode, and a processed image frame may be displayed by the display unit 606. The image frame processed by the GPU 6041 may be stored in the memory 609 (or another storage medium) or transmitted via the radio frequency unit 601 or network module 602. The microphone 6042 is configured to receive a sound, and convert the sound into voice data. In a call mode, the processed audio data may be converted into data in a format capable of being transmitted by the radio frequency unit 601 to a mobile communication base station.

The terminal 600 may further include at least one sensor 605, which may include a light sensor, a movement sensor and the other sensors. To be specific, the light sensor may include an ambient light sensor or a proximity sensor. The ambient light sensor is configured to adjust a brightness value of a display panel 6061 in accordance with ambient light. The proximity sensor is configured to turn off the display panel 6061 and/or a backlight source when the terminal 600 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 605 may further include a fingerprint sensor, a pressure sensor, an iris sensor, a molecule sensor, a gyroscope, a barometer, a hygrometer, a thermometer or an infrared sensor, which will not be limited thereto.

The display unit 606 is configured to display information inputted by the user or provided to the user. The display unit 606 may include the display panel 6061, e.g., a liquid crystal display (Liquid Crystal Display, LCD) panel, or an organic light-emitting diode (Organic Light-Emitting Diode, OLED) panel.

The user input unit 607 is configured to receive digital or character information being inputted, and generate a key signal input related to user settings and function control of the terminal. To be specific, the user input unit 607 may include a touch panel 6071 and another input device 6072. The touch panel 6071, also called as touch screen, is configured to collect a touch operation made by the user on or in proximity to the touch panel (e.g., an operation made by the user through any appropriate object or attachment (e.g., finger or stylus) on or in the proximity to the touch panel 6071). The touch panel 6071 may include a touch detection unit and a touch controller. The touch detection unit is configured to detect a touch position of the user and a signal generated due to the touch operation, and transmit the signal to the touch controller. The touch controller is configured to receive touch information from the touch detection unit, convert it into coordinates of a touch point, transmit the coordinates to the processor 610, and receive and execute a command from the processor 610. In addition, the touch panel 6071 may be of a resistive type, a capacitive type, an infrared type or a surface acoustic wave (SAW) type. Besides the touch panel 6071, the user input unit 607 may further include another input device 6072, which may include, but not limited to, a physical keyboard, a functional button (e.g., a volume control button or an on/off button), a trackball, a mouse, and a joystick, which will not be limited thereto.

Further, the touch panel 6071 may cover the display panel 6061. When the touch operation made on or in proximity to the touch panel 6071 has been detected, the touch panel 6071 may transmit the touch information to the processor 610, so as to determine a type of a touch event. Then, the processor 610 may control the display panel 6061 to provide a corresponding visual output in accordance with the type of the touch event. Although the touch panel 6071 and the display panel 6061 are configured as two separate members in FIG. 6 for implementing the input and the out functions, in an embodiment of the present disclosure, the touch panel 6071 and the display panel 6061 may be integrated so as to achieve the input and output functions of the terminal, which will not be particularly defined herein.

The interface unit 608 is configured to provide an interface between an external device and the terminal 600. For example, the external device may include a wired or wireless headset port, an external power source port (or a battery charging port), a wired or wireless data port, a memory card port, a port for a device having an identification module, an audio input/output (I/O) port, a video I/O port, and an earphone port. The interface unit 608 is configured to receive an input from the external device (e.g., data information and electricity) and transmit the input to one or more elements of the terminal 600, or transmit data between the terminal 600 and the external device.

The memory 609 is configured to store therein a software application and various data. The memory 609 may mainly include an application storage area and a data storage area. An Operating System (OS) and at least one application for the functions (e.g., an audio/image playing function) may be stored in the application storage area. Data created in accordance with the operation of the mobile phone (e.g., audio data and phonebook) may be stored in the data storage area. In addition, the memory 609 may include a high-speed random access memory, or a non-volatile memory, such as at least one disk storage device, flash storage device, or other volatile solid storage device.

As a control center of the terminal, the processor 610 may be connected to the other members of the terminal via various interfaces and circuits, and configured to run or execute the software program and/or module stored in the memory 609, and call the data stored in the memory 609, so as to execute the functions of the terminal and process the data, thereby to monitor the entire terminal. The processor 610 may include one or more processing units. In a possible embodiment of the present disclosure, an application processor and a modem may be integrated into the processor 610. The application processor is mainly configured to process the operating system, a user interface and the application. The modem is mainly configured to process wireless communication. It should be appreciated that, the modem may alternatively not be integrated into the processor 610.

The power source 611 (e.g., a battery) is configured to supply power to the members of the terminal 600. In a possible embodiment of the present disclosure, the power source 611 is logically connected to the processor 610 via a power source management system, so as to achieve such functions as charging, discharging and power consumption management through the power source management system.

In addition, the terminal 600 may include some functional modules being not shown, which will not be particularly defined herein.

In a possible embodiment of the present disclosure, the present disclosure further provides a terminal, which includes a processor 610, a memory 609, and a computer program stored in the memory 609 and capable of being executed by the processor 610. The processor 610 is configured to execute the computer program so as to implement the above-mentioned sidelink transmission method for the first terminal or implement the above-mentioned sidelink transmission method for the second terminal with a same technical effect, which will not be particularly defined herein to avoid repeated recitation.

The present disclosure further provides in an embodiment a computer-readable storage medium storing therein a computer program. The computer program is executed by a processor, so as to implement the above-mentioned sidelink transmission method for the first terminal or implement the above-mentioned sidelink transmission method for the second terminal with a same technical effect, which will not be particularly defined herein to avoid repeated recitation. The computer-readable storage medium may be a read-only memory (Read-Only Memory, ROM), a random access memory (Random Access Memory, RAM), a magnetic disk or an optical disk.

It should be appreciated that, such words as "include" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, essentially, or parts of the technical solutions of the present disclosure contributing to the prior art, may appear in the form of software products, which may be stored in a storage medium (e.g., ROM/RAM, magnetic disk or optical disk) and include instructions so as to enable a terminal device (e.g., mobile phone, computer, server, air conditioner or network device) to execute the method in the embodiments of the present disclosure.

The embodiments of the present disclosure have been described above with reference to the drawings, but the present disclosure is not limited to the above-mentioned specific embodiments. The above-mentioned specific embodiments are only illustrative and not restrictive. Under the teaching of the present disclosure, a person skilled in the art may make many modifications without departing from the principle of the present disclosure and the scope of protection of the claims, all of which fall within the protection of the present disclosure.

What is claimed is:

1. A sidelink transmission method, operable by a first terminal, comprising:
   transmitting Sidelink Control Information (SCI) through a Physical Sidelink Control Channel (PSCCH) of a sidelink, wherein the SCI comprises an information field, and the information field is used to indicate physical layer information of the sidelink,
   wherein the physical layer information comprises a beta-offset indicator, or the information field comprises a beta-offset indication field,
   wherein in the case that the feedback information is carried in or reused by the PSSCH scheduled by the SCI, the beta-offset indication field or the beta-offset indicator is used to indicate a beta-offset configuration used for bit mapping of the PSSCH; or
   in the case that a value comprised in the beta-offset indication field or the beta-offset indicator belongs to a first predefined sub-space, the beta-offset indication field or the beta-offset indicator is used to indicate that the feedback indication field comprises a feedback bit and indicate the beta-offset configuration used for the bit mapping of the PSSCH.

2. The sidelink transmission method according to claim 1, wherein the physical layer information comprises at least one of:
   feedback information, a scheduling data indicator, an acknowledgement request indicator, a measurement configuration, a reference signal indicator, a feedback object indicator and a Hybrid Automatic Repeat Request (HARQ) process indicator.

3. The sidelink transmission method according to claim 2, wherein the feedback information comprises at least one of: retransmission acknowledgment information and a Channel State Information (CSI) measurement result.

4. The sidelink transmission method according to claim 1, wherein the information field comprises at least one of:
a feedback indication field, a scheduling data indication field, an acknowledgement request indication field, a measurement configuration indication field, a reference signal indication field, a feedback object indication field and an HARQ process number field.

5. The sidelink transmission method according to claim 4, wherein the feedback indication field comprises a predefined value or a predefined code point, and the predefined value or the predefined code point represents that the feedback information is not carried in the SCI or the PSSCH scheduled by the SCI; or
the feedback indication field comprises a feedback bit representing the feedback information; or
the feedback indication field comprises a value in a predefined set, and the value represents that the feedback information is carried in or reused by the PSSCH scheduled by the SCI.

6. The sidelink transmission method according to claim 5, wherein in the case that a quantity of the feedback bits of the feedback information is smaller than a specific threshold, the feedback indication field comprises the feedback bits;
in the case that the quantity of the feedback bits of the feedback information is greater than or equal to the specific threshold, the feedback indication field comprises the value in the predefined set.

7. The sidelink transmission method according to claim 5, wherein an encoding and mapping mode of the feedback information in the PSSCH corresponds to the value; and/or the quantity of the feedback bits of the feedback information in the PSSCH corresponds to the value.

8. The sidelink transmission method according to claim 4, wherein in the beta-offset indication field comprises a predefined value or a predefined code point, and the predefined value or the predefined code point represents that the feedback information is not carried in the SCI or the PSSCH scheduled by the SCI; or
in the case that the value of the beta-offset indication field belongs to a second predefined sub-space, the beta-offset indication field is used to indicate a specific feedback mode.

9. The sidelink transmission method according to claim 8, wherein the specific feedback mode comprises:
a mode that the feedback indication field comprises the predefined value or the predefined code point; or
a mode that the feedback indication field comprises feedback information of a specific type; or
a mode that whether only the feedback bits, rather than high-layer data or a Transport Block (TB), are carried in the PSSCH scheduled by the SCI.

10. The sidelink transmission method according to claim 4, wherein the scheduling data indication field is used to indicate whether only the feedback bits, rather than high-layer data or a TB, are carried in the PSSCH scheduled by the SCI, the scheduling data indication field is a field independent of another field in the SCI, or the scheduling data indication field is at least one value or code point in the other field, wherein the other field is a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field; or
the acknowledgement request indication field is used to indicate whether to transmit acknowledgement feedback by a receiving terminal with respect to the PSSCH scheduled by the SCI, and the receiving terminal is a terminal which receives the PSSCH; or
the measurement configuration indication field is used to indicate whether to enable sidelink channel measurement and indicate a measurement configuration for the sidelink channel measurement; or
the reference signal indication field is used to indicate whether to enable sidelink reference signal measurement, and indicate a reference signal configuration of the sidelink measurement reference signal, wherein when the sidelink reference signal measurement is enabled, a resource mapping position of the PSSCH scheduled by the SCI does not overlap with a resource position of the reference signal; or
the feedback object indication field is used to indicate an Identity (ID) of a receiving terminal, a group ID of the receiving terminal, a fixed ID of the receiving terminal allocated by a network, a temporary ID or a truncated ID of the receiving terminal allocated by the network, wherein the receiving terminal is a terminal that performs feedback; or
the HARQ process number field is used to indicate at least one of an HARQ process for the SCI-scheduling data and an HARQ process for HARQ-Acknowledgement (ACK) feedback.

11. A terminal, which is a first terminal and comprises a memory, a processor, and a computer program stored in the memory and capable of being executed by the processor, wherein the processor is configured to execute the computer program to implement steps of a sidelink transmission method comprising:
transmitting SCI through a PSCCH of a sidelink,
wherein the SCI comprises an information field, and the information field is used to indicate physical layer information of the sidelink,
wherein the physical layer information comprises a beta-offset indicator, or the information field comprises a beta-offset indication field,
wherein in the case that the feedback information is carried in or reused by the PSSCH scheduled by the SCI, the beta-offset indication field or the beta-offset indicator is used to indicate a beta-offset configuration used for bit mapping of the PSSCH; or
in the case that a value comprised in the beta-offset indication field or the beta-offset indicator belongs to a first predefined sub-space, the beta-offset indication field or the beta-offset indicator is used to indicate that the feedback indication field comprises a feedback bit and indicate the beta-offset configuration used for the bit mapping of the PSSCH.

12. The terminal according to claim 11, wherein the physical layer information comprises at least one of:
feedback information a scheduling data indicator, an acknowledgement request indicator, a measurement configuration, a reference signal indicator, a feedback object indicator and a HARQ process indicator.

13. The terminal according to claim 12, wherein the feedback information comprises at least one of:
retransmission acknowledgment information and a CSI measurement result.

14. The terminal according to claim 11, wherein the information field comprises at least one of:
   a feedback indication field, a scheduling data indication field, an acknowledgement request indication field, a measurement configuration indication field, a reference signal indication field, a feedback object indication field and an HARQ process number field.

15. The terminal according to claim 14, wherein the feedback indication field comprises a predefined value or a predefined code point, and the predefined value or the predefined code point represents that the feedback information is not carried in the SCI or the PSSCH scheduled by the SCI; or
   the feedback indication field comprises a feedback bit representing the feedback information; or
   the feedback indication field comprises a value in a predefined set, and the value represents that the feedback information is carried in or reused by the PSSCH scheduled by the SCI.

16. The terminal according to claim 15, wherein in the case that a quantity of the feedback bits of the feedback information is smaller than a specific threshold, the feedback indication field comprises the feedback bits;
   in the case that the quantity of the feedback bits of the feedback information is greater than or equal to the specific threshold, the feedback indication field comprises the value in the predefined set.

17. The terminal according to claim 15, wherein an encoding and mapping mode of the feedback information in the PSSCH corresponds to the value; and/or
   the quantity of the feedback bits of the feedback information in the PSSCH corresponds to the value.

18. The terminal according to claim 14, wherein
   the beta-offset indication field comprises a predefined value or a predefined code point, and the predefined value or the predefined code point represents that the feedback information is not carried in the SCI or the PSSCH scheduled by the SCI; or
   in the case that the value of the beta-offset indication field belongs to a second predefined sub-space, the beta-offset indication field is used to indicate a specific feedback mode.

19. The terminal according to claim 14, wherein the scheduling data indication field is used to indicate whether only the feedback bits, rather than high-layer data or a TB, are carried in the PSSCH scheduled by the SCI, the scheduling data indication field is a field independent of another field in the SCI, or the scheduling data indication field is at least one value or code point in the other field, wherein the other field is a PSSCH time-domain or frequency-domain resource allocation field, the feedback indication field, the beta-offset indication field, the acknowledge request indication field, the measurement configuration indication field, the reference signal indication field, the feedback object indication field information, or the HARQ process number field; or
   the acknowledgement request indication field is used to indicate whether to transmit acknowledgement feedback by a receiving terminal with respect to the PSSCH scheduled by the SCI, and the receiving terminal is a terminal which receives the PSSCH; or
   the measurement configuration indication field is used to indicate whether to enable sidelink channel measurement and indicate a measurement configuration for the sidelink channel measurement; or
   the reference signal indication field is used to indicate whether to enable sidelink reference signal measurement, and indicate a reference signal configuration of the sidelink measurement reference signal, wherein when the sidelink reference signal measurement is enabled, a resource mapping position of the PSSCH scheduled by the SCI does not overlap with a resource position of the reference signal; or
   the feedback object indication field is used to indicate an ID of a receiving terminal, a group ID of the receiving terminal, a fixed II) of the receiving terminal allocated by a network, a temporary ID or a truncated ID of the receiving terminal allocated by the network, wherein the receiving terminal is a terminal that performs feedback; or
   the HARQ process number field is used to indicate at least one of an HARQ process for the SCI-scheduling data and an HARQ process for HARQ-ACK feedback.

20. A non-transitory computer-readable storage medium storing therein a computer program, wherein the computer program is capable of being executed by a processor to implement steps of a sidelink transmission method comprising:
   transmitting SCI through a PSCCH of a sidelink,
   wherein the SCI comprises an information field, and the information field is used to indicate physical layer information of the sidelink,
   wherein the physical layer information comprises a beta-offset indicator, or the information field comprises a beta-offset indication field,
   wherein in the case that the feedback information is carried in or reused by the PSSCH scheduled by the SCI, the beta-offset indication field or the beta-offset indicator is used to indicate a beta-offset configuration used for bit mapping of the PSSCH; or
   in the case that a value comprised in the beta-offset indication field or the beta-offset indicator belongs to a first predefined sub-space, the beta-offset indication field or the beta-offset indicator is used to indicate that the feedback indication field comprises a feedback bit and indicate the beta-offset configuration used for the bit mapping of the PSSCH.

* * * * *